United States Patent
Huang et al.

(10) Patent No.: US 12,353,818 B2
(45) Date of Patent: Jul. 8, 2025

(54) OPTIMIZING METHOD, DEVICE AND NON-TRANSIENT COMPUTER READABLE MEDIUM FOR INTEGRATED CIRCUIT LAYOUT

(71) Applicant: REALTEK SEMICONDUCTOR CORP., Hsinchu (TW)

(72) Inventors: Cheng-Chen Huang, Hsinchu (TW); Chun-Chuan Kuo, Hsinchu (TW)

(73) Assignee: REALTEK SEMICONDUCTOR CORP., Hsinchu (TW)

( * ) Notice: Subject to any disclaimer, the term of this patent is extended or adjusted under 35 U.S.C. 154(b) by 563 days.

(21) Appl. No.: 17/880,342

(22) Filed: Aug. 3, 2022

(65) Prior Publication Data

US 2023/0237240 A1 Jul. 27, 2023

(30) Foreign Application Priority Data

Jan. 24, 2022 (TW) .................................. 111102818

(51) Int. Cl.
*G06F 30/398* (2020.01)
*G06F 30/3308* (2020.01)
(Continued)

(52) U.S. Cl.
CPC .......... *G06F 30/398* (2020.01); *G06F 30/367* (2020.01); *G06F 30/392* (2020.01);
(Continued)

(58) Field of Classification Search
USPC ....... 716/115, 112, 120, 127, 129, 130, 133; 703/14, 18
See application file for complete search history.

(56) References Cited

U.S. PATENT DOCUMENTS 6,427,226 B1 * 7/2002 Mallick ............... G06F 30/3312
716/113
7,302,662 B2 11/2007 Lee et al.
(Continued)

FOREIGN PATENT DOCUMENTS

CN H10150107 A * 5/2021
JP 3426911 B2 * 5/1997
(Continued)

OTHER PUBLICATIONS

Chen et al., Chinese Patent Document No. CN-112749526-A, published May 4, 2021, 3 pages including abstract, claims and 1 drawing. (Year: 2021).*

*Primary Examiner* — Phallaka Kik
(74) *Attorney, Agent, or Firm* — Li & Cai Intellectual Property (USA) Office (57) ABSTRACT

An optimizing method, device and non-transient computer readable medium for an integrated circuit layout are provided. The method includes: identifying power rails and corresponding power supply domains in an integrated circuit design file; performing design rule check for circuit units in the integrated circuit design file to calculate a plurality of usable regions; determining electromigration violation points corresponding to the power rails and related current information; defining, according to the electromigration violation points and the current information, paths to be corrected on the power rails corresponding to the electromigration violation points; replacing types of vias on the power rails that do not overlap with the paths to be corrected; and correcting a number of the vias on the power rails that overlap with the paths to be corrected to reduce a number of the electromigration violation points.

19 Claims, 6 Drawing Sheets

(51) Int. Cl.
  *G06F 30/367*  (2020.01)
  *G06F 30/373*  (2020.01)
  *G06F 30/392*  (2020.01)
  *G06F 30/394*  (2020.01)

(52) U.S. Cl.
  CPC ........ *G06F 30/3308* (2020.01); *G06F 30/373* (2020.01); *G06F 30/394* (2020.01)

(56) References Cited

U.S. PATENT DOCUMENTS

| | | | |
|---|---|---|---|
| 7,451,411 B2* | 11/2008 | Hau-Riege | G06F 30/394 716/132 |
| 7,996,808 B2* | 8/2011 | Arp | G06F 30/394 716/126 |
| 8,276,110 B2 | 9/2012 | Baviskar et al. | |
| 10,289,780 B1* | 5/2019 | Verma | G06F 30/367 |
| 10,748,889 B2* | 8/2020 | Berzins | G06F 30/394 |
| 11,093,684 B2* | 8/2021 | Yang | G03F 1/36 |
| 2002/0040465 A1* | 4/2002 | Kimura | G06F 30/367 716/112 |
| 2003/0226121 A1* | 12/2003 | Yokogawa | G06F 30/367 716/115 |
| 2004/0168136 A1* | 8/2004 | Mau | G06F 30/367 716/115 |
| 2005/0102117 A1* | 5/2005 | Habitz | G06F 30/367 702/133 |
| 2005/0160391 A1* | 7/2005 | Orita | G06F 30/394 326/80 |
| 2007/0300200 A1* | 12/2007 | Hau-Riege | G06F 30/394 716/139 |
| 2009/0031264 A1* | 1/2009 | Rittman | G06F 30/398 716/106 |
| 2009/0031274 A1* | 1/2009 | Arp | G06F 30/394 716/126 |
| 2010/0037197 A1* | 2/2010 | Fukunaga | G06F 30/39 716/126 |
| 2012/0280287 A1 | 11/2012 | Hou et al. | |
| 2013/0167100 A1* | 6/2013 | Guthaus | G06F 30/20 716/124 |
| 2013/0212544 A1* | 8/2013 | Yu | G06F 30/30 716/112 |
| 2014/0101626 A1* | 4/2014 | Yu | G06F 30/30 716/102 |
| 2015/0074630 A1* | 3/2015 | Akiyama | G06F 30/398 716/114 |
| 2018/0210995 A1* | 7/2018 | Patra | G06F 30/398 |
| 2020/0134132 A1* | 4/2020 | Yu Tseng | G06F 30/398 |
| 2021/0042460 A1* | 2/2021 | Lin | G06F 30/3308 |
| 2022/0147692 A1* | 5/2022 | Yu Tseng | G06F 30/398 |

FOREIGN PATENT DOCUMENTS

| | | | | |
|---|---|---|---|---|
| JP | 2010021187 A | * | 1/2010 | ........ G06F 17/5068 |
| JP | 2015053001 A | * | 3/2015 | ........ G06F 17/5081 |
| TW | I722616 B | * | 3/2021 | ............ G06F 30/00 |

* cited by examiner

OPTIMIZING METHOD, DEVICE AND NON-TRANSIENT COMPUTER READABLE MEDIUM FOR INTEGRATED CIRCUIT LAYOUT

CROSS-REFERENCE TO RELATED PATENT APPLICATION

This application claims the benefit of priority to Taiwan Patent Application No. 111102818, filed on Jan. 24, 2022. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to an integrated circuit design technology, and more particularly to an optimizing method, an optimizing device and a non-transient computer readable medium for an integrated circuit layout.

BACKGROUND OF THE DISCLOSURE

After completing a circuit layout of an integrated circuit, standard cells are usually placed all over the IC. A power rail refers to a metal wire connected to power pin(s) or ground pin(s) of the standard cell. For multiple standard cells at the same level, multiple corresponding power rails are directly connected to one another. In certain designs, the standard cells may even be connected with each other through the same vertical line.

In such circuit layouts, the power rails not only share routing resources of a metal layer with those used for signal routing, but also needs to be configured at high utilization. Therefore, out of the entire power supply design, metal wires of the power rails are relatively thinner, and thus have a higher likelihood of experiencing severe electromigrations.

In order to reduce a negative impact of electromigration on the power rails during power planning, most existing methods rely on using more routing resources for the power planning, e.g., by increasing a width of the power rails. However, the more power rails that are used, the less routing resources are available for use, such as to increase the difficulty in design.

SUMMARY OF THE DISCLOSURE

In response to the above-referenced technical inadequacies, the present disclosure provides an optimizing method, an optimizing device and a non-transient computer readable medium for an integrated circuit layout.

In one aspect, the present disclosure provides an optimizing method for an integrated circuit layout, and the optimizing method includes: identifying, from an integrated circuit design file, a plurality of power rails and a plurality of power domains corresponding to the plurality of power rails; performing design rule check on a plurality of circuit units generated by placing and routing in the integrated circuit design file, so as to calculate a plurality of usable regions; performing a simulation process on the circuit units for current and voltage analysis, so as to determine electromigration violation points corresponding to the plurality of power rails and related current information; defining, according to the electromigration violation points and the current information, paths to be corrected on the power rails corresponding to the electromigration violation points; replacing types of vias on the power rails that do not overlap with the paths to be corrected; and correcting a number of vias on the power rails that overlap with the paths to be corrected, so as to reduce a number of the electromigration violation points.

In another aspect, the present disclosure provides an optimizing device for an integrated circuit layout, and the optimizing device includes a memory and a processor. The memory is configured to store a plurality of computer-executable instructions, and the processor is electrically coupled to the memory and configured to retrieve and execute the plurality of computer-executable instructions, to execute an optimizing method, which includes: identifying, from an integrated circuit design file, a plurality of power rails and a plurality of power domains corresponding to the plurality of power rails; performing design rule check on a plurality of circuit units generated by placing and routing in the integrated circuit design file, so as to calculate a plurality of usable regions; performing a simulation process on the circuit units for current and voltage analysis, so as to determine electromigration violation points corresponding to the plurality of power rails and related current information; defining, according to the electromigration violation points and the current information, paths to be corrected on the power rails corresponding to the electromigration violation points; replacing types of vias on the power rails that do not overlap with the paths to be corrected; and correcting a number of vias on the power rails that overlap with the paths to be corrected, so as to reduce a number of the electromigration violation points.

In yet another aspect, the present disclosure provides a non-transitory computer-readable medium, including a plurality of computer-readable instructions that are executable by a processor of a computer system for performing an optimizing method, which includes: identifying, from an integrated circuit design file, a plurality of power rails and a plurality of power domains corresponding to the plurality of power rails; performing design rule check on a plurality of circuit units generated by placing and routing in the integrated circuit design file, so as to calculate a plurality of usable regions; performing a simulation process on the circuit units for current and voltage analysis, so as to determine electromigration violation points corresponding to the plurality of power rails and related current information; defining, according to the electromigration violation points and the current information, paths to be corrected on the power rails corresponding to the electromigration violation points; replacing types of vias on the power rails that do not overlap with the paths to be corrected; and correcting a number of vias on the power rails that overlap with the paths to be corrected, so as to reduce a number of the electromigration violation points.

Therefore, in the optimizing method, the optimizing device and the non-transitory computer-readable medium for the integrated circuit layout provided by the present disclosure, based on a design rule checking (DRC) manner for connection relationships of circuit elements, it can be detected whether a density of vias between a double-layered power rail on a certain section after placement and routing can be adjusted, so that currents of the power rail can be distributed. Therefore, negative impacts caused by electromigrations can be reduced without violating design rules.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

Figure 1:
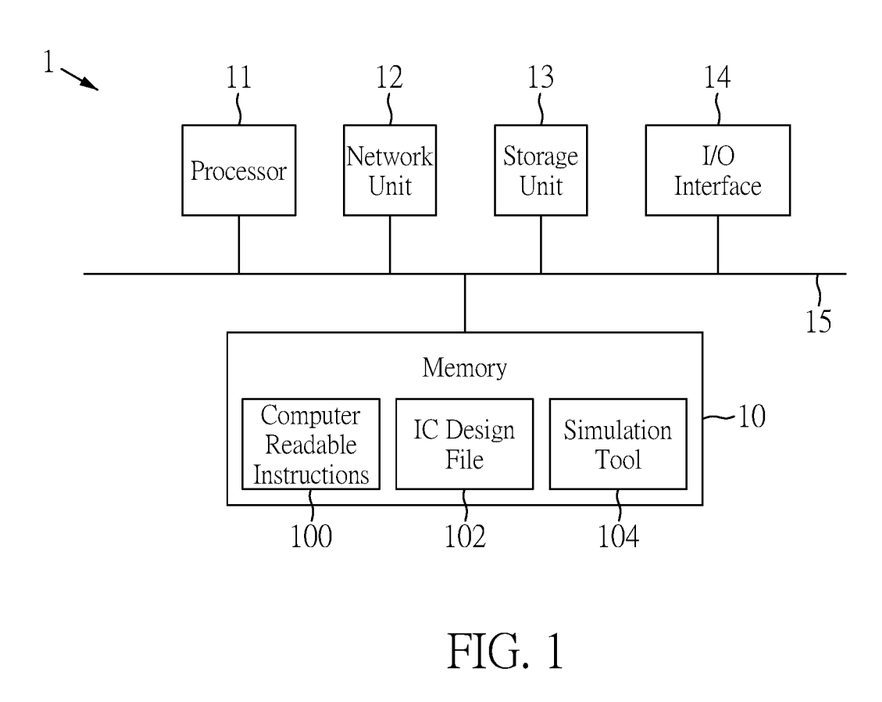
FIG. 1 is a functional block diagram of an optimizing device for an integrated circuit layout according to one embodiment of the present disclosure.

FIG. 1 is a functional block diagram of an optimizing device for an integrated circuit layout according to one embodiment of the present disclosure. Referring to FIG. 1, one embodiment of the present disclosure provides an optimizing device 1 for an integrated circuit layout, and the optimizing device 1 includes a memory 10, a processor 11, a network unit 12, a storage unit 13 and an input/output (I/O) interface 14. The aforementioned elements can communicate with one other through, for example, but not limited to, a bus 15.

The memory 10 is any storage device that can be configured to store data, such as, but not limited to, a random access memory (RAM), a read only memory (ROM), a flash memory, a hard disk or other storage device that can be configured to store data. The memory 10 is configured to store at least a plurality of computer readable instructions 100. In one embodiment, the memory 10 can also be configured to store temporary data which is generated when the processor 11 performs operations.

The processor 11 is electrically coupled to the memory 10, and is configured to access computer-readable instructions 100 from the memory 10, so as to control components in the optimizing device 1 to perform functions of the optimizing device 1.

The network unit 12 is configured to perform network access under a control of the processor 11. The storage unit 13 can be, for example, but not limited to, a magnetic disk or an optical disk, to store data or instructions under the control of the processor 11. The input/output (I/O) interface 14 can be operated by a user to communicate with the processor 11, in order to input and output data.

Figure 2:
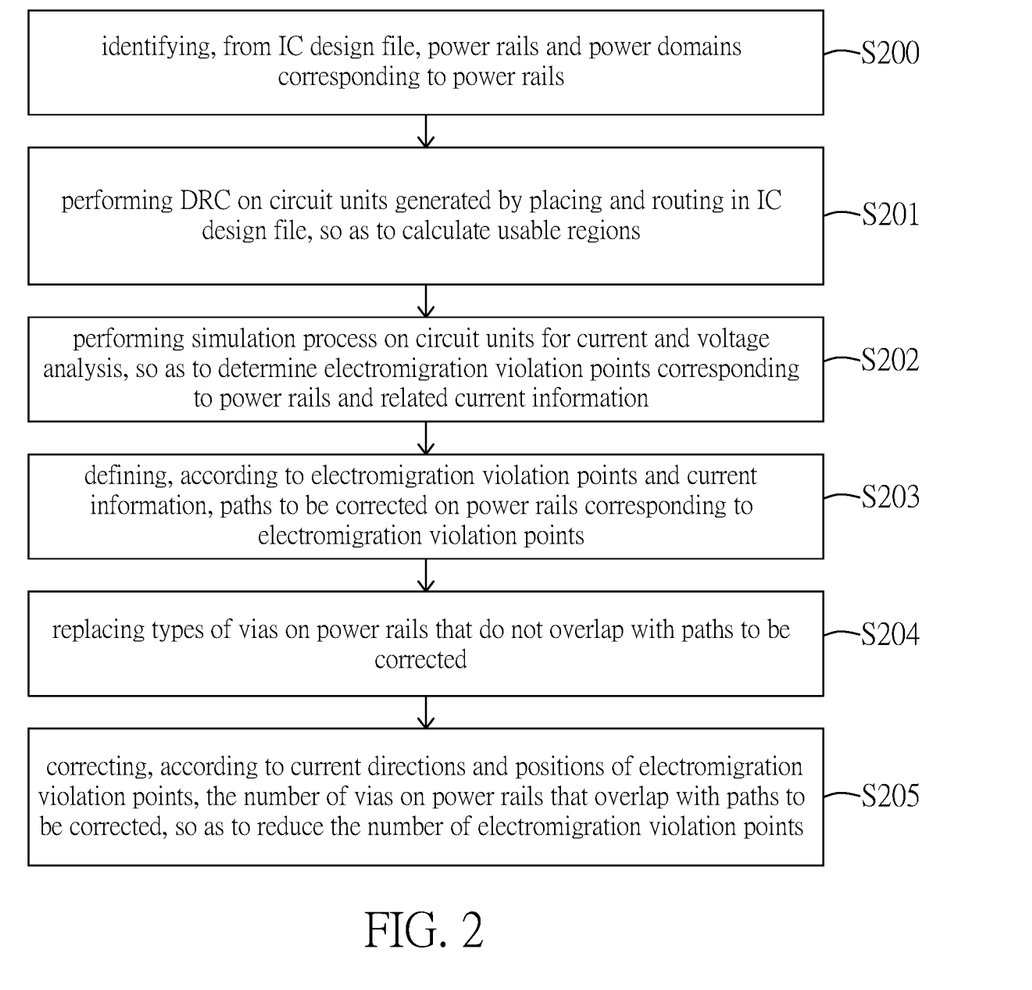
FIG. 2 is a flowchart of an optimizing method for an integrated circuit layout according to one embodiment of the present disclosure.

FIG. 2 is a flowchart of an optimizing method for an integrated circuit layout according to one embodiment of the present disclosure. FIG. 2 provides an optimizing method for an integrated circuit layout, the optimizing method can be applied to the optimizing device 1 shown in FIG. 1, or can be implemented by other hardware components such as databases, general processors, computers, servers, or other unique hardware devices with particular logic circuits or apparatus with particular functions, in which, for example, codes and the processors/chips are integrated into a unique hardware. In more detail, the optimizing method can be implemented using a computer program to control each of the elements of the optimizing device 1. The computer program may be stored in a non-transitory computer-readable storage medium, such as a ROM, the flash memory, floppy disks, the hard disks, the optical disks, flash drives, magnetic tapes, network-accessible databases or a computer-readable recording medium with the same functions among others that can be easily contemplated by those skilled in the art.

Referring to FIG. 2, an optimizing method for an integrated circuit layout includes the following steps:

Step S200: identifying, from an integrated circuit (IC) design file, a plurality of power rails and a plurality of power domains corresponding to the plurality of power rails. In some embodiments, the IC design file 102 may be stored in, for example, but not limited to, the memory 10 and accessed by the processor 11. The IC design file includes design data for multiple different circuit elements and power rails.

Specifically, in this step, the power rails refer to a plurality of double-layer power rails. In one double-layer power rail, two power rails respectively arranged in two metal layers are included, and the two power rails are connected through a plurality of vias. The subsequent steps are mainly to determine whether a via density of each double-layer power rail can be increased or decreased, and it is not emphasized hereinafter that the power rails refer to the double-layer power rails.

Figure 3:
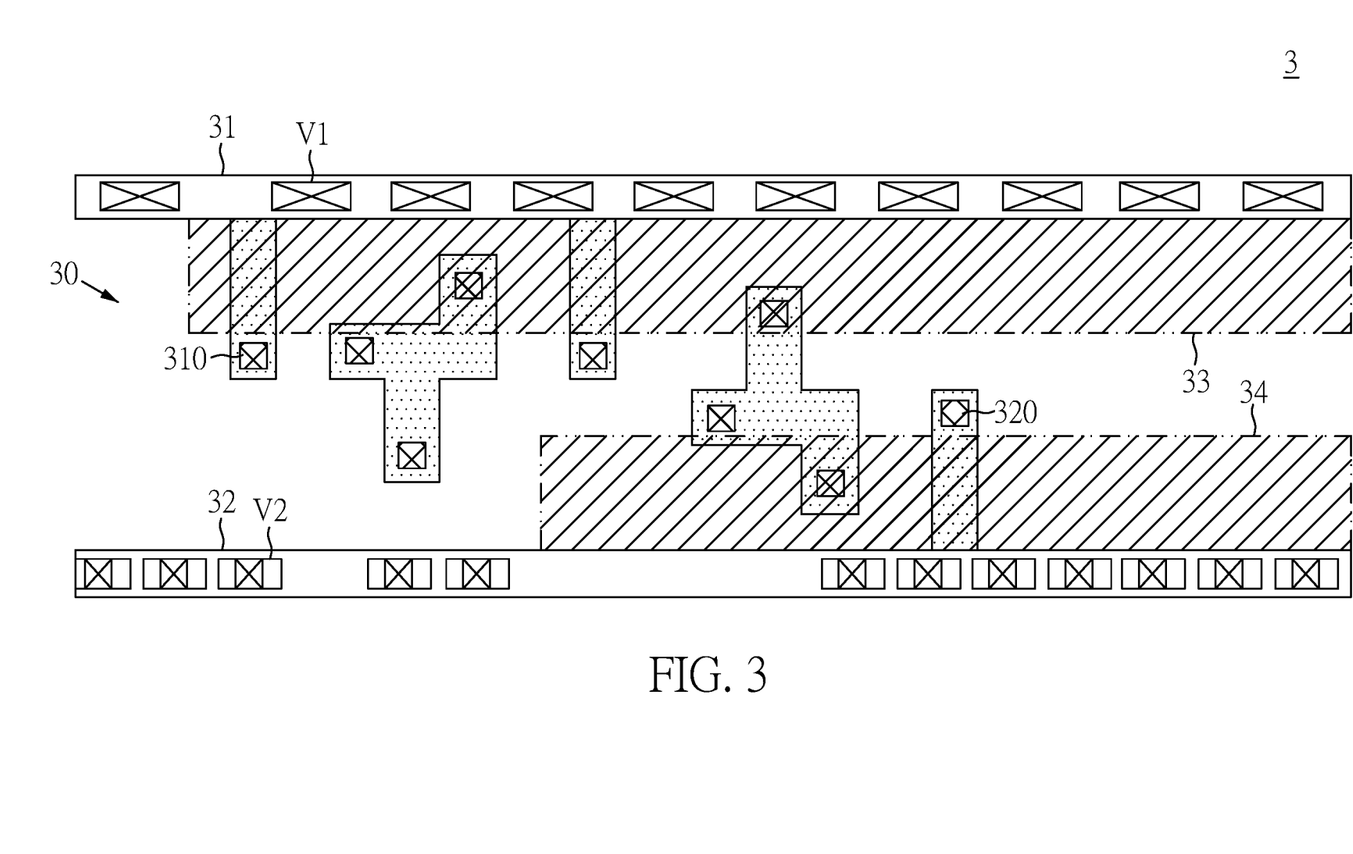
FIG. 3 is a schematic layout diagram of an integrated circuit 3 according to one embodiment of the present disclosure.

Reference is made to FIG. 3, which is a schematic layout diagram of an integrated circuit 3 according to one embodiment of the present disclosure. As shown in FIG. 3, the integrated circuit 3 exemplarily includes at least one circuit unit 30 and power rails 31, 32. In the present embodiment, the power rails 31 and 32 are both double-layer power rails, the power rail 31 has a plurality of large vias V1, and the power rail 32 has a plurality of small vias V2. In this embodiment, the numbers of the circuit units 30, the power rails 31 and 32, the large vias V1 and the small vias V2 are only examples, and the present disclosure is not limited thereto.

The circuit unit 30 can be, for example, various logic operation gates, operation units or other circuits with specific functions, for performing operations and processing on input data. In some embodiments, the circuit unit 30 can be a standard cell, which is the smallest circuit unit.

The power rails 31 and 32 are electrically coupled to the circuit unit 30 through power contacts, such as contacts 310 and 320, respectively. In one embodiment, the power rail 31 can provide power to the circuit unit 30 from a voltage source, and the power rail 32 can be connected to a ground line having a ground potential to provide a ground potential to the circuit unit 30. For circuit units 30 with different requirements, the power rails 31 and 32 may provide powers with different voltages, or powers with the same voltage but from different sources. Therefore, when the circuit units 31 and 32 operate according to different power sources, they belong to different power domains, respectively.

Step S201: performing design rule check (DRC) on a plurality of circuit units generated by placing and routing in the integrated circuit design file, so as to calculate a plurality of usable regions.

In order to meet design specifications, the circuit unit 30 usually does not exhaust all designable space to maintain flexibility. Therefore, after the circuit unit 30 is generated by placing and routing, and after DRC is performed, the plurality of usable regions can be obtained. At least a part of the usable regions are adjacent to one another and correspond to the power rails 31 and 32, such as usable regions 33 and 34 shown in FIG. 3.

Step S202: performing a simulation process on the circuit units for current and voltage analysis, so as to determine electromigration violation points corresponding to the plurality of power rails and related current information.

In this step, after the usable regions 33 and 34 are obtained, the circuit unit 30 in the integrated circuit design file 102 can be simulated to generate current and voltage analysis, so as to determine regions corresponding to the power rails 31 and 32 that are easily affected by electromigrations (EMs).

Specifically, the memory 10 can store a simulation tool 104, which can be executed by the processor 11 accessing the memory 10. The simulation tool 104 can be configured to perform voltage and current simulations to determine the current(s) from one or more components within the integrated circuit 3, and to compare the current(s) to a set current limit, so as to the electromigration violation points corresponding to the power rail 31, 32. The simulation tool 104 can also obtain a plurality of current directions and a plurality of current magnitudes on the power rails corresponding to the electromigration violation points.

For example, if the currents on the power rails 31, 32 violate the current limit, electromigration violations are identified. In some embodiments, the simulation tool 104 can include a simulation program with integrated circuit emphasis (SPICE) simulator.

Step S203: defining, according to the electromigration violation points and the current information, paths to be corrected on the power rails corresponding to the electromigration violation points.

In detail, the paths to be corrected can by defined by several ways.

Figure 4:
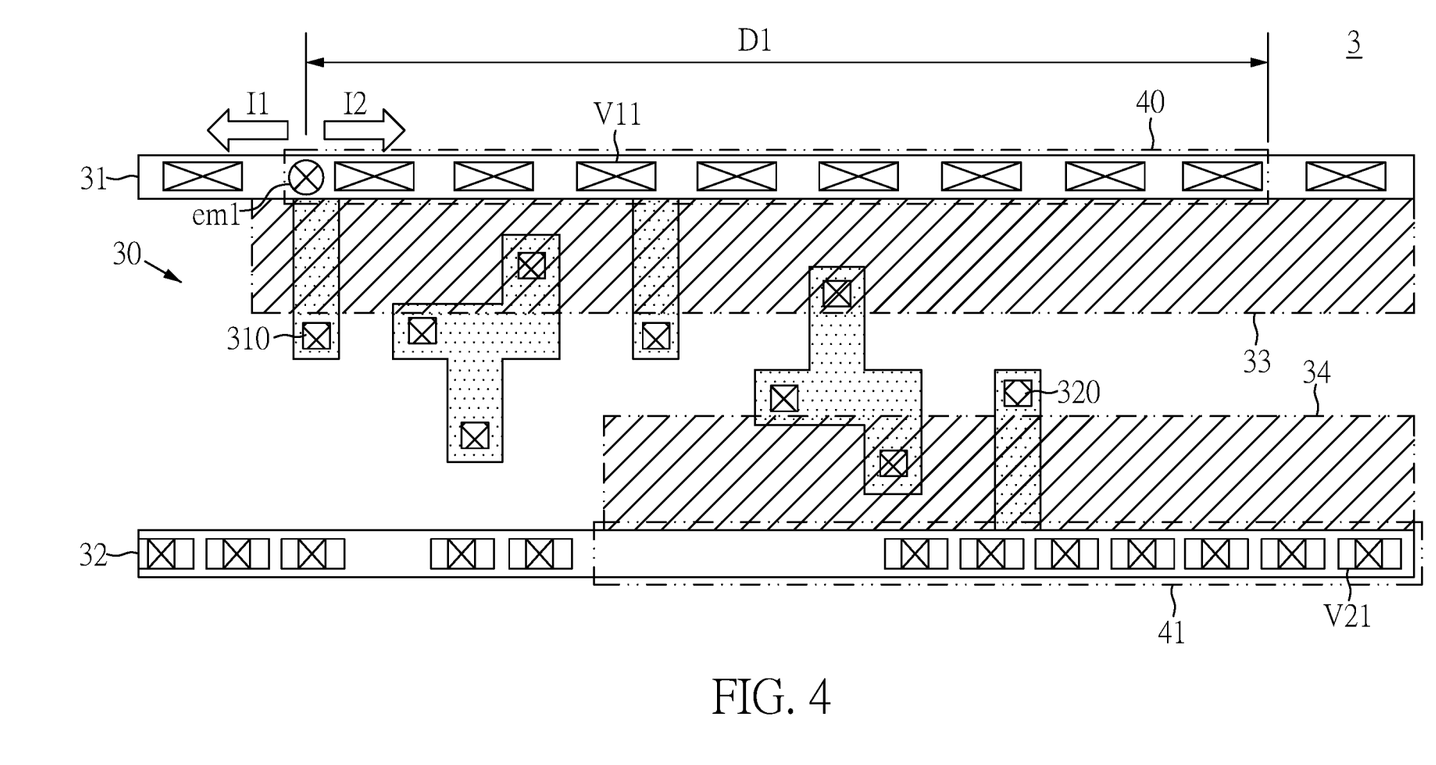
FIG. 4 is a first schematic diagram showing paths to be corrected being defined in a schematic layout of an integrated circuit 3 according to one embodiment of the present disclosure.

Reference is made to FIG. 4, which is a first schematic diagram showing that paths to be corrected are defined in a schematic layout of an integrated circuit 3 according to one embodiment of the present disclosure.

As shown in FIG. 4, for one of the electromigration violation points, such as an electromigration violation point em1, one side with higher current is found according to current information. Taking FIG. 4 as an example, a current I2 on one side of the electromigration violation point em1 is greater than a current I1 on the other side. Therefore, one path to be corrected 40 of the paths to be corrected is formed by defining a first predetermined distance D1 from the electromigration violation point em1 to the side with the larger current I2 along the corresponding power rail 31.

Figure 5:
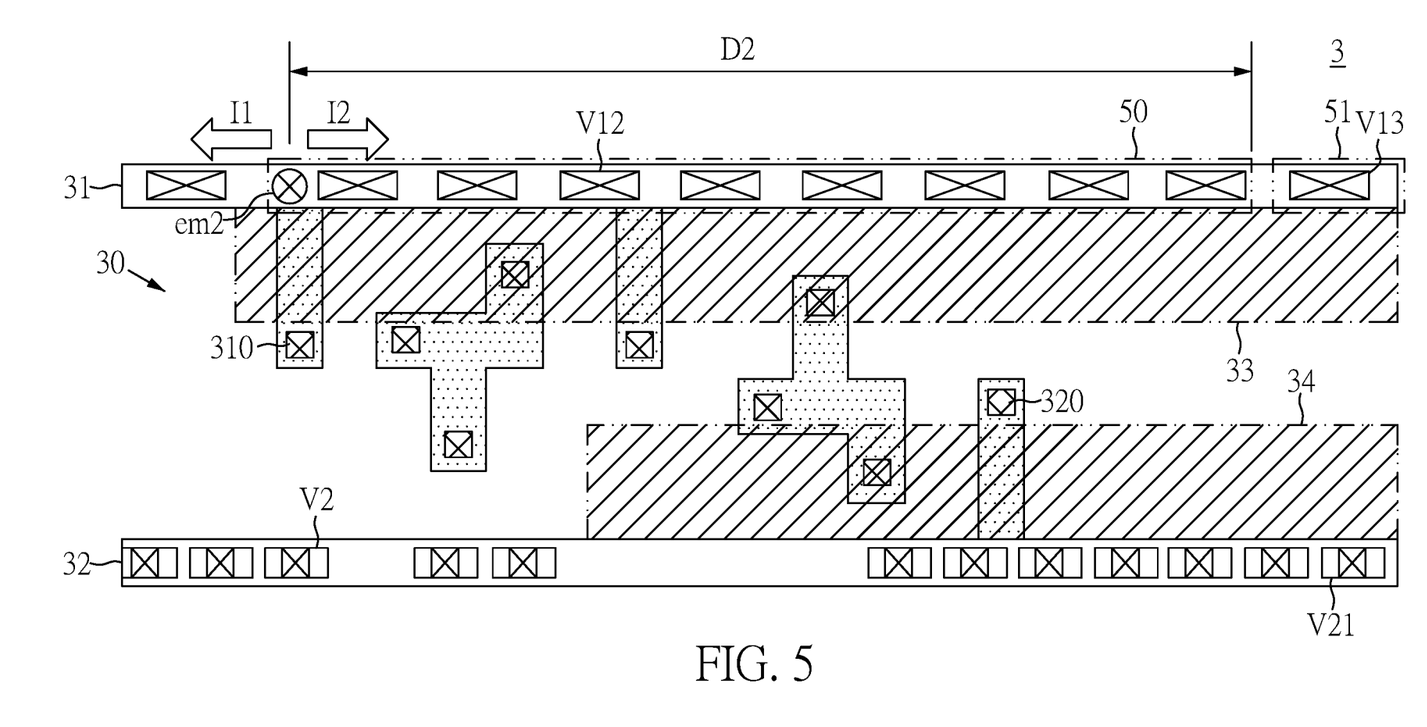
FIG. 5 is a second schematic diagram showing paths to be corrected being defined in the schematic layout of the integrated circuit 3 according to one embodiment of the present disclosure.

Reference is made to FIG. 5, which is a second schematic diagram showing that paths to be corrected are defined in the schematic layout of the integrated circuit 3 according to one embodiment of the present disclosure.

As shown in FIG. 5, for one of the electromigration violation points, such as an electromigration violation point em2, one side with lower current is found according to the current information. Taking FIG. 5 as an example, a current I2 on one side of the electromigration violation point em2 is lower than a current I1 on the other side. Therefore, one path to be corrected 50 of the paths to be corrected is formed by defining a second predetermined distance D2 from the electromigration violation point em2 to the side with the lower current I2 along the corresponding power rail 31.

Figure 6:
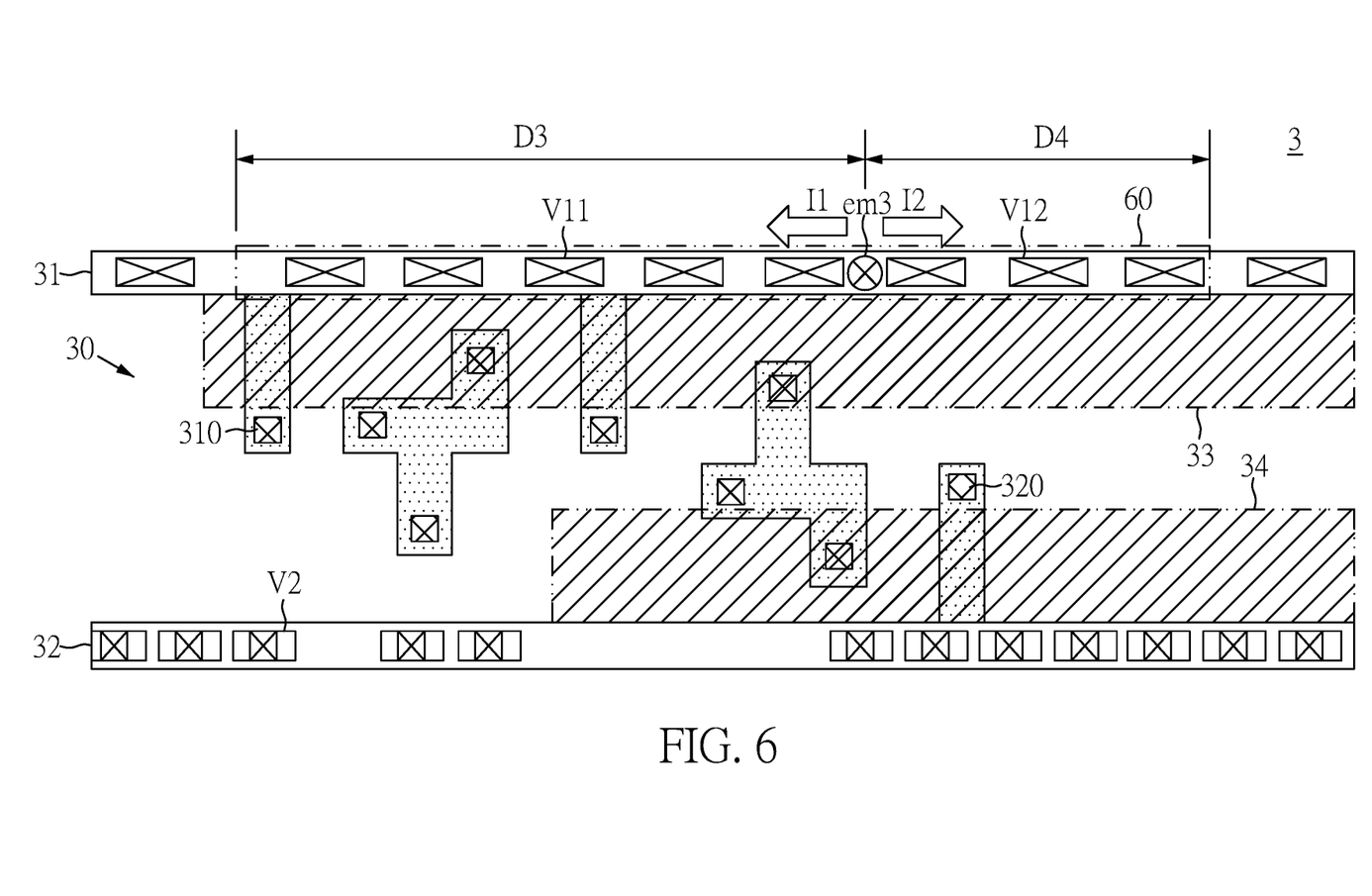
FIG. 6 is a third schematic diagram showing paths to be corrected being defined in the schematic layout of the integrated circuit 3 according to one embodiment of the present disclosure.

Reference is made to FIG. 6, which is a third schematic diagram showing that paths to be corrected are defined in the schematic layout of the integrated circuit 3 according to one embodiment of the present disclosure.

As shown in FIG. 6, for one of the electromigration violation points, such as an electromigration violation point em3, a first side with lower current and a second side with higher current are found according to the current information. Taking FIG. 6 as an example, a current I1 on the first side of the electromigration violation point em3 is smaller than the current I2 on the second side. Therefore, one path to be corrected 60 of the paths to be corrected is formed by defining a third predetermined distance D3 from the electromigration violation point em3 to the first side with the lower current I1 along the corresponding power rail 31 and defining a fourth predetermined distance D4 from the electromigration violation point em3 to the second side with the larger current I2 along the corresponding power rail 31.

Step S204: replacing types of vias on the power rails that do not overlap with the paths to be corrected. For example, after step S203 is performed, types of a via V13, corresponding to a portion 51 of a usable region 33 on the power rails (e.g., the power rail 31 of FIG. 5) whose paths to be corrected are not found, are replaced. For example, a via size of the via V13 can be replaced with a larger via size, so as to guide larger currents into these regions by reducing impedances, thereby reducing the number of the electromigration violation points in the layout of the integrated circuit 3. On the other hand, although not specifically shown in FIG. 4, if the power rail 32 of FIG. 4 is connected to a specific electromigration violation point, the type of the vias V21 in a portion 41 of the usable region 34 can be replaced to reduce the number of the electromigration violation points.

Step S205: correcting, according to the plurality of current directions and positions of the electromigration violation points, the number of vias on the power rails that overlap with the paths to be corrected, so as to reduce the number of the electromigration violation points.

In detail, this step is to reduce the electromigration violations by adjusting a via density in the paths to be corrected.

Therefore, taking FIG. 4 as an example, since the path to be corrected 40 has a relatively high current, a part or all of the vias V11 on the path to be corrected 40 are removed to increase the impedance, so as to guide the larger current I2 to be shunted to the side with the lower current I1, until the corresponding electromigration violation point em1 disappears, or a violation level of the electromigration violation point em1 is reduced as much as possible, for example, the current of the electromigration violation point em1 is adjusted to be close as much as possible to a set current limit without exceeding the set current limit by too much.

Therefore, taking FIG. 5 as an example, since the path to be corrected 50 has a relatively low current, additional vias are added on the path to be corrected 50, or the type of vias are changed to increase the size of vias, so as to reduce the impedance to guide the larger current I1 to be shunted to the side with the lower current I2, until the corresponding electromigration violation point em2 disappears, or a violation level of the electromigration violation point em2 is reduced as much as possible, for example, the current of the electromigration violation point em2 is adjusted to be as close as possible to a set current limit without exceeding the set current limit by too much.

Next, taking FIG. 6 as an example, since the path to be corrected 60 has the lower current I1 on the first side and the larger current I2 one the second side, additional vias are added in a part that the path to be corrected 60 extends to the first side, or the type of vias are changed to increase the size of vias. Meanwhile, a portion or all of the vias V12 in a part that the path to be corrected 60 extends to the second side are removed, so as to reduce an impedance of a part with lower current and increase an impedance of a part with larger current to guide the larger current I2 to be shunted to the side with the lower current I1, until the corresponding electromigration violation point em3 disappears, or a violation level of the electromigration violation point em3 is reduced to a furthest possible extent. It should be noted that, in the step of removing the vias, it is necessary to determine whether the vias can be removed, so as to avoid affecting the normal operation of the circuit unit 30.

Therefore, through the above method, in addition to reducing the negative impact caused by the electromigrations on the power rail, existing routing resources are not additionally occupied, and since the usable regions has passed the design rule check, it is not necessary to perform the design rule check to correct where the via density changes.

Beneficial Effects of the Embodiments

In conclusion, in the optimizing method, the optimizing device and the non-transitory computer-readable medium for the integrated circuit layout provided by the present disclosure, based on a design rule checking (DRC) manner for connection relationships of circuit elements, it can be detected whether a density of vias between a double-layered power rail on a certain section after placement and routing can be adjusted, so that currents of the power rail can be distributed. Therefore, negative impacts caused by electromigrations can be reduced without violating design rules.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. An optimizing method for an integrated circuit layout, the optimizing method comprising:
   identifying, from an integrated circuit design file, a plurality of power rails and a plurality of power domains corresponding to the plurality of power rails;
   performing design rule check on a plurality of circuit units generated by placing and routing in the integrated circuit design file, so as to calculate a plurality of usable regions;
   performing a simulation process on the circuit units for current and voltage analysis, so as to determine electromigration violation points corresponding to the plurality of power rails and related current information;
   defining, according to the electromigration violation points and the current information, paths to be corrected on the power rails corresponding to the electromigration violation points;
   replacing types of vias on the power rails that do not overlap with the paths to be corrected; and
   correcting, according to the plurality of current directions and positions of the electromigration violation points, a number of vias on the power rails that overlap with the paths to be corrected, so as to reduce a number of the electromigration violation points.

2. The optimizing method according to claim 1, wherein the step of replacing the types of the vias further includes replacing the vias with a plurality of vias of a larger size.

3. The optimizing method according to claim 1, wherein the step of defining the paths to be corrected further includes:
   for one of the electromigration violation points, finding a side with a higher current according to the current information, and defining a first predetermined distance from the one of the electromigration violation points to the side along the corresponding power rail as one of the paths to be corrected.

4. The optimizing method according to claim 3, wherein the step of correcting the number of the vias further includes removing the vias on the paths to be corrected.

5. The optimizing method according to claim 1, wherein the step of defining the paths to be corrected includes:
   for one of the electromigration violation points, finding a side with a lower current according to the current information, and defining a second predetermined distance from the one of the electromigration violation points to the side along the corresponding power rail to be taken as one of the paths to be corrected.

6. The optimizing method according to claim 5, wherein the step of correcting the number of the vias further includes adding additional vias on the paths to be corrected.

7. The optimization method according to claim 5, wherein the step of correcting the number of the vias further includes adding additional vias in a portion extending toward the first side in the paths to be corrected, and reducing the number of the vias in a portion extending toward the second side in the paths to be corrected.

8. The optimizing method according to claim 1, wherein the step of defining the paths to be corrected includes:
for one of the electromigration violation points, finding a first side with a lower current and a second side with a higher current according to the current information, and defining a third predetermined distance from the one of the electromigration violation points to the first side along the corresponding power rail and defining a fourth predetermined distance from the of the electromigration violation points to the second side along the corresponding power rail, so as to define the paths to be corrected.

9. The optimizing method according to claim 1, wherein the current information includes a plurality of current directions and a plurality of current magnitudes of the power rails corresponding to the electromigration violation points.

10. An optimizing device for an integrated circuit layout, comprising:
a memory configured to store a plurality of computer-executable instructions; and
a processor electrically coupled to the memory and configured to retrieve and execute the plurality of computer-executable instructions, configured to execute an optimizing method including:
identifying, from an integrated circuit design file, a plurality of power rails and a plurality of power domains corresponding to the plurality of power rails;
performing design rule check on a plurality of circuit units generated by placing and routing in the integrated circuit design file, so as to calculate a plurality of usable regions;
performing a simulation process on the circuit units for current and voltage analysis, so as to determine electromigration violation points corresponding to the plurality of power rails and related current information;
defining, according to the electromigration violation points and the current information, paths to be corrected on the power rails corresponding to the electromigration violation points;
replacing types of vias on the power rails that do not overlap with the paths to be corrected; and
correcting, according to the plurality of current directions and positions of the electromigration violation points, a number of vias on the power rails that overlap with the paths to be corrected, so as to reduce a number of the electromigration violation points.

11. The optimizing device according to claim 10, wherein the step of replacing the types of the vias further includes replacing the vias with a plurality of vias of a larger size.

12. The optimizing device according to claim 10, wherein the step of defining the paths to be corrected further includes:

for one of the electromigration violation points, finding a side with a higher current according to the current information, and defining a first predetermined distance from the one of the electromigration violation points to the side along the corresponding power rail as one of the paths to be corrected.

13. The optimizing device according to claim 12, wherein the step of correcting the number of the vias further includes removing the vias on the paths to be corrected.

14. The optimizing device according to claim 10, wherein the step of defining the paths to be corrected includes:
for one of the electromigration violation points, finding a side with a lower current according to the current information, and defining a second predetermined distance from the one of the electromigration violation points to the side along the corresponding power rail to be taken as one of the paths to be corrected.

15. The optimizing device according to claim 14, wherein the step of correcting the number of the vias further includes adding additional vias on the paths to be corrected.

16. The optimization device according to claim 14, wherein the step of correcting the number of the vias further includes adding additional vias in a portion extending toward the first side in the paths to be corrected, and reducing the number of the vias in a portion extending toward the second side in the paths to be corrected.

17. The optimizing device according to claim 10, wherein the step of defining the paths to be corrected includes:
for one of the electromigration violation points, finding a first side with a lower current and a second side with a higher current according to the current information, and defining a third predetermined distance from the one of the electromigration violation points to the first side along the corresponding power rail and defining a fourth predetermined distance from the one of the electromigration violation points to the second side along the corresponding power rail, so as to define the paths to be corrected.

18. The optimizing device according to claim 10, wherein the current information includes a plurality of current directions and a plurality of current magnitudes of the power rails corresponding to the electromigration violation points.

19. A non-transitory computer-readable medium, comprising a plurality of computer-readable instructions that are executable by a processor of a computer system for performing an optimizing method comprising:
identifying, from an integrated circuit design file, a plurality of power rails and a plurality of power domains corresponding to the plurality of power rails;
performing design rule check on a plurality of circuit units generated by placing and routing in the integrated circuit design file, so as to calculate a plurality of usable regions;
performing a simulation process on the circuit units for current and voltage analysis, so as to determine electromigration violation points corresponding to the plurality of power rails and related current information;
defining, according to the electromigration violation points and the current information, paths to be corrected on the power rails corresponding to the electromigration violation points;
replacing types of vias on the power rails that do not overlap with the paths to be corrected; and
correcting, according to the plurality of current directions and positions of the electromigration violation points, a number of vias on the power rails that overlap with the paths to be corrected, so as to reduce a number of the electromigration violation points.

* * * * *